(12) United States Patent
VanBlon et al.

(10) Patent No.: US 11,294,565 B2
(45) Date of Patent: Apr. 5, 2022

(54) PRESENTING ON A PORTION OF A FOLDABLE DISPLAY

(71) Applicant: LENOVO (Singapore) PTE. LTD., New Tech Park (SG)

(72) Inventors: Russell Speight VanBlon, Raleigh, NC (US); Kyle Jared McDaniel, Raleigh, NC (US); Peter Hamilton Wetsel, Apex, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/985,774

(22) Filed: Aug. 5, 2020

(65) Prior Publication Data
US 2022/0043566 A1    Feb. 10, 2022

(51) Int. Cl.
G06F 3/0488 (2013.01)
G06F 3/01 (2006.01)
G06F 3/04886 (2022.01)

(52) U.S. Cl.
CPC .......... G06F 3/04886 (2013.01); G06F 3/012 (2013.01); *G06F 2203/04803* (2013.01)

(58) Field of Classification Search
CPC .. G06F 1/1643; G06F 1/3206; G06F 3/04486; G06F 3/012; G06F 2200/1637; G06F 2203/04102; G06F 2203/04803
See application file for complete search history.

(56) References Cited

U.S. PATENT DOCUMENTS

| | | | | |
|---|---|---|---|---|
| 5,731,805 A | * | 3/1998 | Tognazzini | G06F 3/013 345/156 |
| 8,934,229 B2 | * | 1/2015 | Thorson | G06F 1/1618 361/679.27 |
| 11,137,894 B1 | * | 10/2021 | Chen | G06F 3/04817 |
| 2002/0109662 A1 | * | 8/2002 | Miller | G06F 1/1641 345/100 |
| 2003/0051179 A1 | * | 3/2003 | Tsirkel | G06F 1/3203 713/300 |
| 2010/0064244 A1 | * | 3/2010 | Kilpatrick, II | G06F 1/1649 715/773 |
| 2013/0201101 A1 | * | 8/2013 | Niu | G06F 3/1423 345/156 |
| 2013/0229324 A1 | * | 9/2013 | Zhang | G09G 5/14 345/1.3 |

* cited by examiner

*Primary Examiner* — Mihir K Rayan
(74) *Attorney, Agent, or Firm* — Kunzler Bean & Adamson (57) ABSTRACT

For presenting on a portion of a foldable display, a processor detects a reflex angle fold display orientation for the foldable display. The foldable display includes a primary portion display and a secondary portion display. In response to the reflex angle fold display orientation, the processor presents an output presentation on the primary portion display.

14 Claims, 5 Drawing Sheets

PRESENTING ON A PORTION OF A FOLDABLE DISPLAY

FIELD

The subject matter disclosed herein relates to presenting on a display and more particularly relates to presenting on a portion of a foldable display.

BACKGROUND

Foldable displays may be folded with a reflex angle.

BRIEF SUMMARY

An apparatus for presenting on a portion of a foldable display is disclosed. The apparatus includes the foldable display, a processor, and a memory. The processor detects a reflex angle fold display orientation for the foldable display. The foldable display comprises a primary portion display and a secondary portion display. In response to the reflex angle fold display orientation, the processor presents an output presentation on the primary portion display. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including a converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
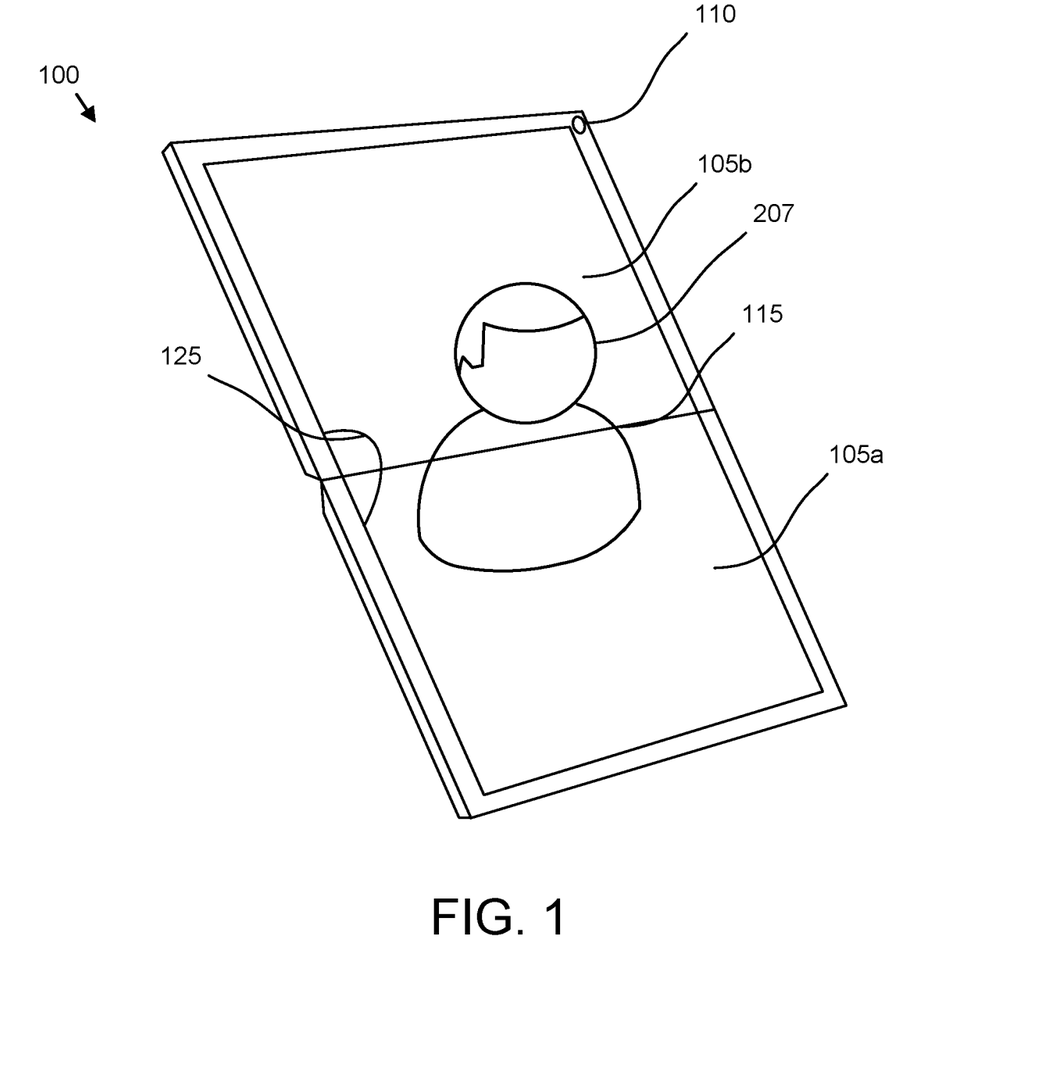
FIG. 1 is a perspective drawing illustrating one embodiment of a foldable display.

FIG. 1 is a perspective drawing illustrating one embodiment of a foldable display 105. The foldable display 105 presents text and images for an electronic device 100. The foldable display 105 includes a fold line 115. The electronic device 100 and foldable display 105 fold along the fold line 115 as will be shown hereafter. The fold line 115 may divide the foldable display 105 into at least a primary portion display 105a and a secondary portion display 105b.

In the depicted embodiment, the foldable display 105 is in a single side fold display orientation with a fold angle 125 of less than or equal to 180 degrees. In a certain embodiment, the single side fold display orientation has a fold angle 125 of less than or equal to 200 degrees.

In one embodiment, the electronic device 100 includes a sensor 110. The sensor 110 may be selected from the group consisting of a camera, a proximity sensor, an infrared sensor, a microphone, and touch screen pixels. The touch screen pixels may be embodied in the foldable display 105.

The foldable display 105 may present an output presentation 207 across both the primary portion display 105a and the secondary portion display 105b. As a result, the foldable display 105 functions as a single display.

Figure 2A:
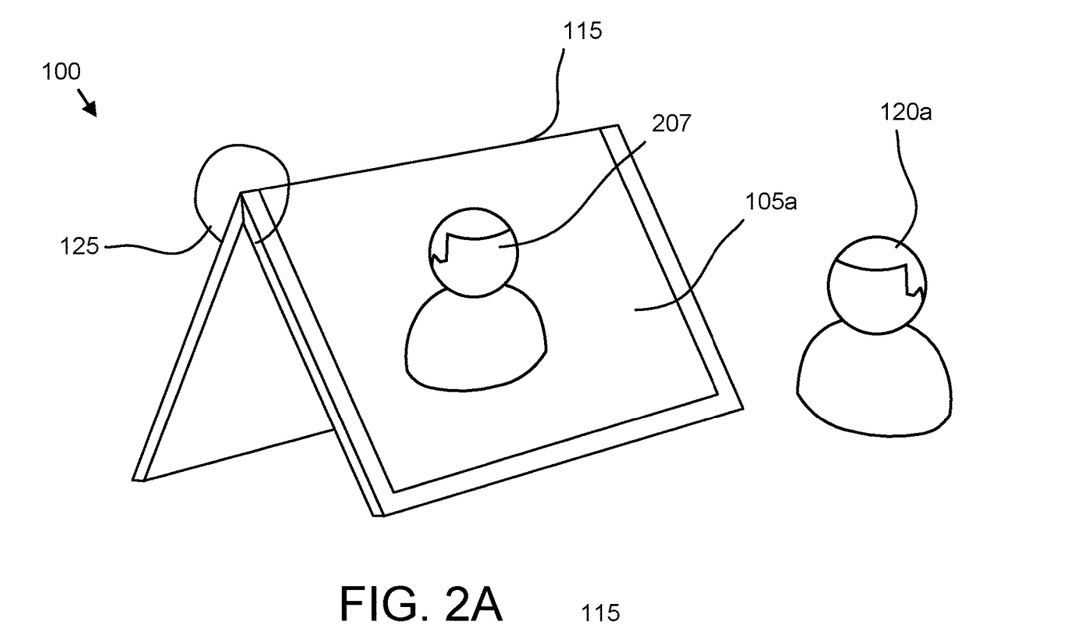
FIG. 2A is a perspective drawing illustrating one alternate embodiment of a foldable display.

FIG. 2A is a perspective drawing illustrating one alternate embodiment of the foldable display 105 with the primary portion display 105a visible. In the depicted embodiment, the electronic device 100 is folded along the fold line 115 in a reflex angle fold display orientation with a reflex fold angle 125 of greater than 180 degrees. In a certain embodiment, the electronic device 100 and/or foldable display 105 forms a tent shape.

A primary observer 120a may view the primary portion display 105a as the electronic device 100 and/or foldable display 105 is in the reflex angle fold display orientation. In a certain embodiment, the primary observer 120a may only view the primary portion display 105a while the electronic device 100 and/or foldable display 105 is in the reflex angle fold display orientation.

In the past, the electronic device 100 presented an output presentation 207 on both the primary portion display 105a and the secondary portion display 105b as shown in FIG. 1. The embodiments may present an output presentation 207 on the primary portion display 105a in response to the reflex angle fold display orientation. The output presentation 207 may be re-flowed to be presented completely within the primary portion display 105a.

Figure 2B:
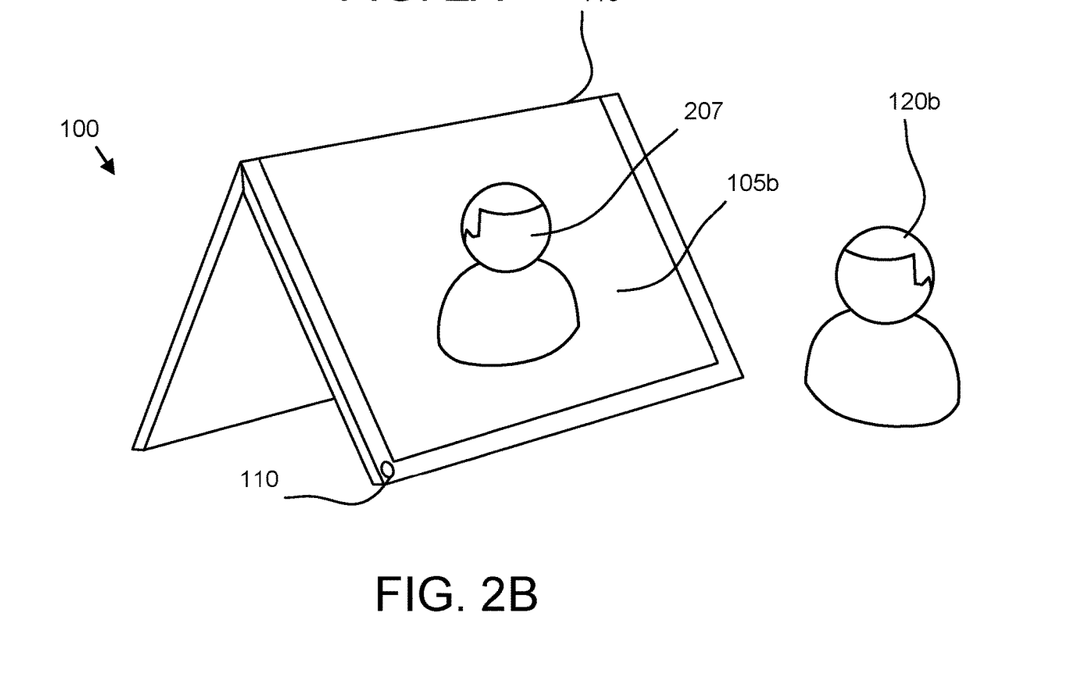
FIG. 2B is a perspective drawing illustrating one alternate embodiment of a foldable display.

FIG. 2B is a perspective drawing illustrating one alternate embodiment of the foldable display 105. The electronic device 100 of FIG. 2A is shown with the secondary portion display 105b visible. The secondary portion display 105b may not be visible to the primary observer 120a.

At times, it may be desirable to present the output presentation 207 on the secondary portion display 105b. For example, if a secondary observer 120b is viewing the electronic device 100 with the permission of the primary observer 120a, it is desirable to present the output presentation 207 on the secondary portion display 105b.

The embodiments detect the secondary observer 120b of the secondary portion display 105b and present the output presentation 207 on the secondary portion display 105b. As a result, both the primary observer 120a and the secondary observer 120b may view the output presentation 207. However, if the secondary observer 120b is not detected, the embodiments may present a null presentation on the secondary portion display 105b. As a result, the output presentation 207 is available to the secondary observer 120b if the secondary observer 120b is using the electronic device 100 with the primary observer 120a, but the output presentation 207 is not available on the secondary portion display 105b if no secondary observer 120b is present.

Figure 3:
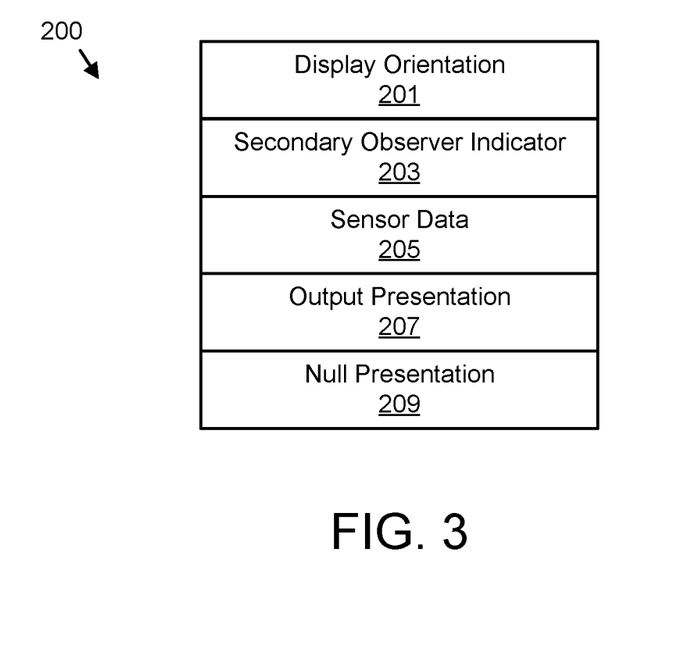
FIG. 3 is a schematic block diagram illustrating one embodiment of presentation data.

FIG. 3 is a schematic block diagram illustrating one embodiment of presentation data 200. The presentation data 200 may be used to determine how to present on the primary portion display 105a and the secondary portion display 105b. The presentation data 200 may be organized as a data structure in a memory. In the depicted embodiment, the presentation data 200 includes a display orientation 201, a secondary observer indicator 203, sensor data 205, the output presentation 207, and a null presentation 209.

The display orientation 201 may indicate one of the reflex angle fold display orientation 201 and the single side fold display orientation 201. The display orientation 201 may be determined based on the fold angle 125.

The secondary observer indicator 203 may be asserted in response to detecting the secondary observer 120b. In a certain embodiment, the secondary observer indicator 203 also indicates whether the primary observer 120a is detected.

The sensor data 205 may record the output of the sensor 110. The sensor data 205 may be selected from the group consisting of a face scan, a retinal scan, a thermal detection, a depth detection, a fingerprint, an audible input, and a touch. For example, a camera sensor 110 may capture a face scan of the secondary observer 120b. In addition, the secondary portion display 105b functioning as the sensor 110 may capture a touch of the secondary observer 120b.

The output presentation 207 comprises images and/or text that are presented on the primary portion display 105a, the secondary portion display 105b, or combinations thereof. The null presentation 209 may be a blank screen, a designated image, and the like. The null presentation 209 may be presented on the secondary portion display 105b if no secondary observer 120b is detected while the foldable display 105 is in the reflex angle fold display orientation 201.

Figure 4:
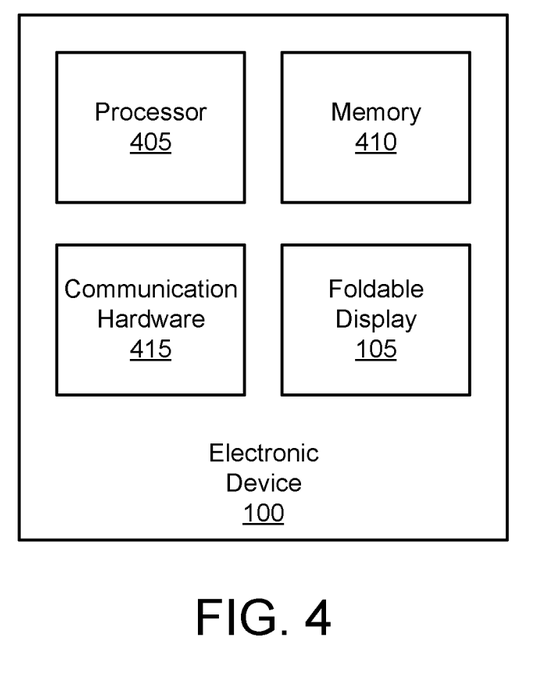
FIG. 4 is a schematic block diagram illustrating one embodiment of an electronic device.

FIG. 4 is a schematic block diagram illustrating one embodiment of the electronic device 100. In the depicted embodiment, the electronic device 100 includes a processor 405, a memory 410, communication hardware 415, and the foldable display 105. The memory 410 may include a semiconductor storage device, a hard disk drive, an optical storage device, or combinations thereof. The memory 410 may store code. The processor 405 may execute the code. The communication hardware 415 may communicate with other devices and/or a network. The foldable display 105 presents the output presentation 207 and/or the null presentation 209.

Figure 5:
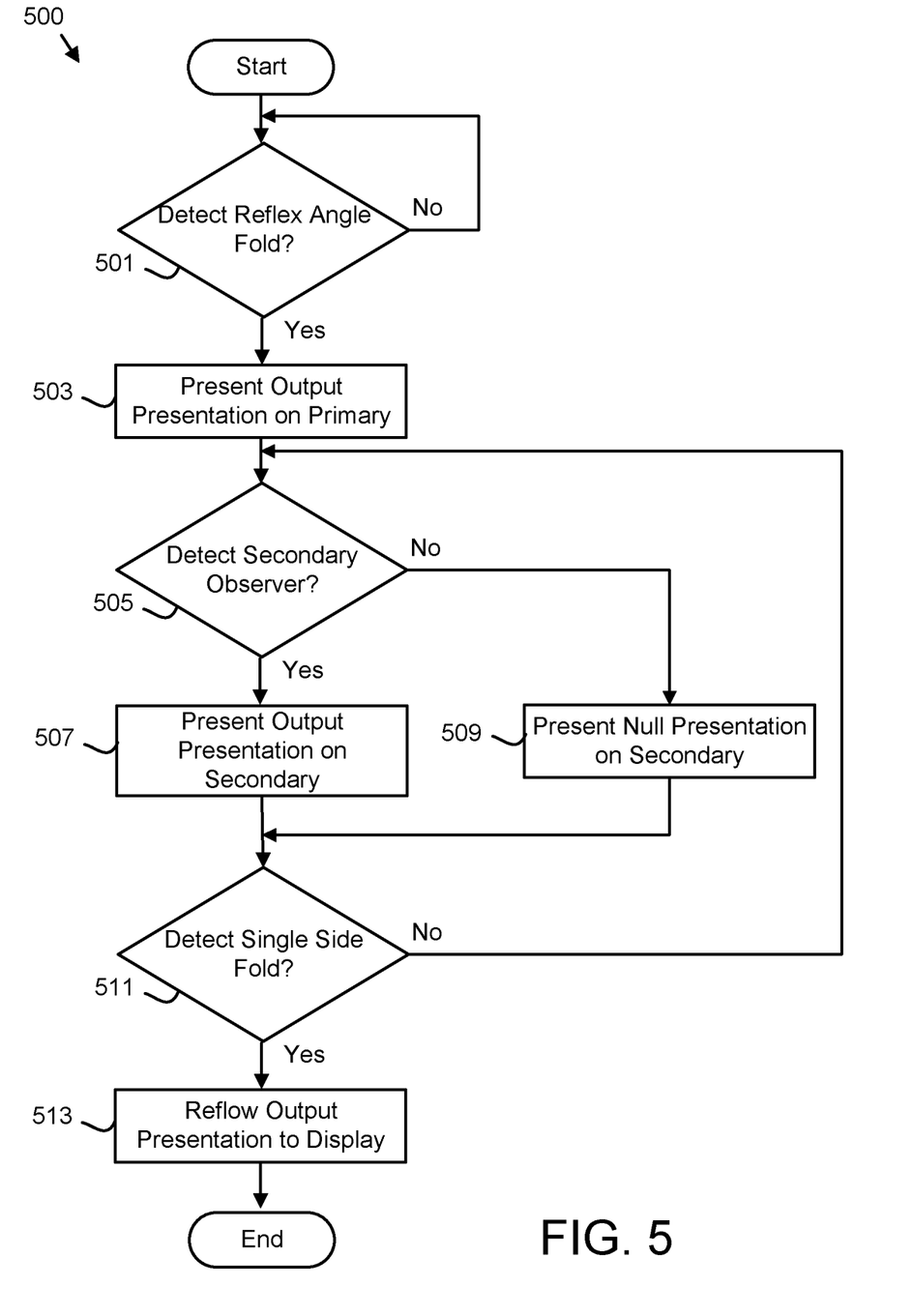
FIG. 5 is a schematic flow chart diagram illustrating one embodiment of a foldable display presentation method.

FIG. 5 is a schematic flow chart diagram illustrating one embodiment of a foldable display presentation method 500. The method 500 to text the reflex angle fold display orientation 201 and presents the output presentation 207 on the primary portion display 105a. The method 500 may be performed by the electronic device 100 and/or processor 405.

The method 500 starts, and in one embodiment, the processor 405 detects 501 the reflex angle fold display orientation 201 for the foldable display 105. The reflex angle fold display orientation 201 may be detected 501 in response to determining the fold N angle 125 is greater than 180 degrees. In a certain embodiment, the reflex angle fold display orientation 201 is detected 501 in response to determining the fold angle 125 is greater than 200 degrees.

If the reflex angle fold display orientation 201 is not detected 501, the processor 405 continues to detect 501 the reflex angle fold display orientation 201. If the reflex angle fold display orientation 201 is detected 501, the processor 405 presents 503 the output presentation 207 on the primary portion display 105a. In one embodiment, the output presentation 207 is reflowed to fill the primary portion display 105a. In a certain embodiment, the output presentation 207 is reflowed to be contained entirely within the primary portion display 105a.

The processor 405 may detect 505 the secondary observer 120b of the secondary portion display 105b. In one embodiment, the processor 405 detects 505 the secondary observer 120b viewing the secondary portion display 105b. For example, the secondary observer 120b may only be detected 505 if the secondary observer 120b is determined to be viewing the secondary portion display 105b. In one embodiment, the secondary observer 120b is determined to be viewing the secondary portion display 105b based on eye tracking of the secondary observer 120b by the sensor 110.

In one embodiment, the secondary observer 120b is detected 505 in response to a face scan of the secondary observer 120b with a camera sensor 110. In a certain embodiment, only a secondary observer 120b that is identified by the face scan and that has permission to view the output presentation 207 is detected 505. The secondary observer 120b may also be detected based on a retinal scan. The retinal scan may identify the secondary observer 120b. In a certain embodiment, only a secondary observer 120b that is identified by the retinal scan and that has permission to view the output presentation 207 is detected 505.

In one embodiment, the sensor 110 is an infrared sensor 110. The secondary observer 120b may be detected 505 from a thermal detection.

In one embodiment, the sensor 110 is a camera sensor 110. The secondary observer 120b may be detected based on depth detection. In a certain embodiment, the secondary observer 120b is only detected 505 in response to the secondary observer 120b being within a specified distance of the secondary portion display 105b.

In a certain embodiment, the sensor 110 is a camera sensor 110 and a text the fingerprint of the secondary observer 120b. The fingerprint may identify the secondary observer 120b. The secondary observer 120b may only be detected 505 if the secondary observer 120b is identified from the fingerprint and if the secondary observer 120b has permission to view the output presentation 207.

The sensor 110 may be a microphone sensor 110. The secondary observer 120b may be detected from an audible input such as the secondary observer 120b speaking.

In response to not detecting the secondary observer 120b of the secondary portion display 105b, the processor 405 presents the null presentation 209 on the secondary portion display 105b. In a certain embodiment, the processor 405 presents the null presentation 209 on the secondary portion display 105b in response to not detecting the secondary observer 120b viewing the secondary portion display 105b.

In response to detecting the secondary observer 120b of the secondary portion display 105b, the processor 405 may present the output presentation 207 on the secondary portion display 105b. In one embodiment, the output presentation 207 is reflowed to fill the secondary portion display 105b. In a certain embodiment, the output presentation 207 is reflowed to be contained entirely within the secondary portion display 105b.

In one embodiment, the processor 405 detects 511 the single side fold display orientation 201. The single side fold display orientation 201 may be detected 511 in response to the display angle 125 being less than or equal to 180 degrees. In a certain embodiment, the single side fold display orientation 201 is detected 511 in response to the display angle 125 being less than or equal to 200 degrees.

If the single side fold display orientation 201 is not detected 511, the processor 405 continues to detect 505 the secondary observer 120b. If the single side fold display orientation 201 is detected 511, the processor 405 may reflow the output presentation 207 to an upright orientation in the primary portion display 105a and the secondary portion display 105b and the method 500 ends. The output presentation 207 may fill the primary portion display 105a and the secondary portion display 105b.

The embodiments detect the reflex angle fold display orientation 201 and present the output presentation 207 in the primary portion display 105a. The output presentation 207 may be only presented in the primary portion display 105a. In addition, the embodiments may detect the secondary observer 120b of the secondary portion display 105b and present the output presentation 207 on the secondary portion display 105b. As a result, if there is a secondary observer 120b, the secondary server 120b is also able to view the output presentation 207, improving the function of the electronic device 100.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a foldable display;
   a processor;
   a memory that stores code executable by the processor to:
   detect a reflex angle fold display orientation for the foldable display, wherein the foldable display comprises a primary portion display and a secondary portion display;
   in response to the reflex angle fold display orientation, present an output presentation on the primary portion display to a primary observer;
   detect a secondary observer of the secondary portion display;
   in response to detecting the secondary observer of the secondary portion display, present the output presentation on the secondary portion display; and
   in response to not detecting the secondary observer viewing the secondary portion display, present a null presentation on the secondary portion display.

2. The apparatus of claim 1, wherein the secondary observer is detected viewing the secondary portion display.

3. The apparatus of claim 1, wherein the secondary observer is detected from sensor data selected from the group consisting of a face scan, a retinal scan, a thermal detection, a depth detection, a fingerprint, an audible input, and a touch.

4. The apparatus of claim 1, wherein the secondary observer is detected by a sensor selected from the group consisting of a camera, a proximity sensor, an infrared sensor, a microphone, and touch screen pixels.

5. The apparatus of claim 1, wherein the code is further executable by the processor to:
   detect a single side fold display orientation; and
   in response to detecting the single side fold display orientation, reflow the output presentation to an upright orientation in the primary portion display and the secondary portion display, the output presentation filling the primary portion display and the secondary portion display.

6. A method comprising:
   detecting, by use of a processor, a reflex angle fold display orientation for a foldable display, wherein the foldable display comprises a primary portion display and a secondary portion display; and
   in response to the reflex angle fold display orientation, presenting an output presentation on the primary portion display to a primary observer;
   detecting a secondary observer of the secondary portion display;

in response to detecting the secondary observer of the secondary portion display, presenting the output presentation on the secondary portion display; and in response to not detecting the secondary observer viewing the secondary portion display, presenting a null presentation on the second portion display.

7. The method of claim 6, wherein the secondary observer is detected viewing the secondary portion display.

8. The method of claim 6, wherein the secondary observer is detected from sensor data selected from the group consisting of a face scan, a retinal scan, a thermal detection, a depth detection, a fingerprint, an audible input, and a touch.

9. The method of claim 6, wherein the secondary observer is detected by a sensor selected from the group consisting of a camera, a proximity sensor, an infrared sensor, a microphone, and touch screen pixels.

10. The method of claim 6, the method further comprising:

detecting a single side fold display orientation; and in response to detecting the single side fold display orientation, reflow the output presentation to an upright orientation in the primary portion display and the secondary portion display, the output presentation filling the primary portion display and the secondary portion display.

11. A program product comprising a non-transitory computer readable storage medium that stores code executable by a processor, the executable code comprising code to:

detect a reflex angle fold display orientation for the foldable display, wherein the foldable display comprises a primary portion display and a secondary portion display; and in response to the reflex angle fold display orientation, present an output presentation on the primary portion display to a primary observer;

detecting a secondary observer of the secondary portion display;

in response to detecting the secondary observer of the secondary portion display, presenting the output presentation on the secondary portion display; and in response to not detecting the secondary observer viewing the secondary portion display, presenting a null presentation on the second portion display.

12. The program product of claim 11, wherein the secondary observer is detected viewing the secondary portion display.

13. The program product of claim 11, wherein the secondary observer is detected from sensor data selected from the group consisting of a face scan, a retinal scan, a thermal detection, a depth detection, a fingerprint, an audible input, and a touch.

14. The program product of claim 11, wherein the secondary observer is detected by a sensor selected from the group consisting of a camera, a proximity sensor, an infrared sensor, a microphone, and touch screen pixels.

* * * * *